(12) United States Patent
Huffer (10) Patent No.: US 11,623,806 B2
(45) Date of Patent: Apr. 11, 2023

(54) RESEALABLE FLEXIBLE PACKAGING

(71) Applicant: Sonoco Development, Inc., Hartsville, SC (US)

(72) Inventor: Scott William Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 898 days.

(21) Appl. No.: 15/442,779

(22) Filed: Feb. 27, 2017

(65) Prior Publication Data

US 2018/0244452 A1    Aug. 30, 2018

(51) Int. Cl.
*B65D 75/58*    (2006.01)
*B32B 7/05*    (2019.01)
(Continued)

(52) U.S. Cl.
CPC ............ *B65D 75/5855* (2013.01); *B32B 7/05* (2019.01); *B32B 7/06* (2013.01); *B32B 7/12* (2013.01); *B32B 27/08* (2013.01); *B32B 37/12* (2013.01); *B32B 37/1292* (2013.01); *B32B 38/0004* (2013.01); *B65B 61/18* (2013.01); *B65B 61/184* (2013.01); *B65D 65/14* (2013.01);
(Continued)

(58) Field of Classification Search
CPC . B32B 2439/46; B32B 37/12; B32B 37/1292; B32B 38/0004; B32B 7/06; B32B 7/12; B32B 7/05; B32B 27/08; B65B 61/184; B65B 61/18; B65B 61/188; B65D 2575/586; B65D 65/14; B65D 65/40; B65D 75/58; B65D 75/5838; B65D 75/5855; B65D 53/00; B65D 53/08; B65D 55/00; B65D 77/00; B65D 79/00

USPC ....................................................... 428/36.6
See application file for complete search history.

(56) References Cited

U.S. PATENT DOCUMENTS 1,827,636 A    10/1931    Ames
2,131,575 A    9/1938    Whipple
(Continued)

FOREIGN PATENT DOCUMENTS

CA    2918375    1/2015
CN    1558827    12/2004
(Continued)

OTHER PUBLICATIONS

"Tamper-evidence: Consumers have come to expect tamper-evidence for drugs, foods"; Packaging (Boston, Mass.); Mar. 19, 1989; vol. 34, No. 5 (3 pgs.).
(Continued)

*Primary Examiner* — Lee E Sanderson
*Assistant Examiner* — Thomas J Kessler
(74) *Attorney, Agent, or Firm* — Nelson Mullins Riley & Scarborough LLP (57) ABSTRACT

The present invention relates to a flexible packaging comprising a base layer and a film layer at least partially releasably affixed to the base layer via a pressure sensitive adhesive layer. The pressure sensitive adhesive layer comprises at least one adhesive zone and at least one adhesive-free zone extending continuously in a machine direction. The film layer is scored to form at least one pull tab which is disposed within the at least one adhesive-free zone and the base layer is scored to form at least one cavity which is disposed adjacent the at least one adhesive-free zone.

21 Claims, 8 Drawing Sheets

(51) Int. Cl.
  *B65B 61/18*  (2006.01)
  *B32B 7/06*  (2019.01)
  *B32B 7/12*  (2006.01)
  *B32B 27/08*  (2006.01)
  *B32B 37/12*  (2006.01)
  *B32B 38/00*  (2006.01)
  *B65D 65/14*  (2006.01)
  *B65D 65/40*  (2006.01)

(52) U.S. Cl.
  CPC ............ *B65D 65/40* (2013.01); *B65D 75/58* (2013.01); *B65D 75/5838* (2013.01); *B32B 2439/46* (2013.01); *B65D 2575/586* (2013.01)

(56) References Cited

U.S. PATENT DOCUMENTS

| | | |
|---|---|---|
| 2,861,735 A | 11/1958 | Faltin |
| 2,952,395 A | 9/1960 | Spees |
| 2,991,001 A | 7/1961 | Hughes |
| 3,127,087 A | 3/1964 | Spees |
| 3,239,097 A | 3/1966 | Bates et al. |
| 3,259,303 A * | 7/1966 | Repko ................ B65D 75/5833 383/203 |
| 3,266,965 A | 8/1966 | Spees |
| 3,279,331 A | 10/1966 | Platt |
| 3,335,939 A | 8/1967 | Robinson, Jr. |
| 3,942,640 A | 3/1976 | Hellstrom |
| 3,946,872 A | 3/1976 | Sturm |
| 4,023,292 A | 5/1977 | Shibata et al. |
| 4,066,600 A | 1/1978 | Pletcher et al. |
| 4,185,754 A | 1/1980 | Julius |
| 4,264,662 A | 4/1981 | Taylor et al. |
| 4,280,653 A | 7/1981 | Elias |
| 4,345,393 A | 8/1982 | Price et al. |
| 4,353,460 A | 10/1982 | Kahn |
| 4,372,460 A | 2/1983 | Brochman et al. |
| 4,381,848 A | 5/1983 | Kahn |
| 4,420,080 A * | 12/1983 | Nakamura ............ B65B 61/184 206/449 |
| 4,452,842 A | 6/1984 | Borges et al. |
| 4,464,158 A | 8/1984 | Kardon |
| 4,502,599 A | 3/1985 | Perecman |
| 4,531,668 A | 7/1985 | Forbes, Jr. |
| 4,550,831 A * | 11/1985 | Whitford .................. A61L 2/26 206/439 |
| 4,574,952 A | 3/1986 | Masui |
| 4,584,201 A | 4/1986 | Boston |
| 4,679,693 A | 7/1987 | Forman |
| 4,738,365 A | 4/1988 | Prater |
| 4,785,940 A | 11/1988 | Wilson |
| 4,838,429 A | 6/1989 | Fabisiewicz et al. |
| 4,846,504 A | 7/1989 | MacGregor et al. |
| 4,871,265 A | 10/1989 | Peck |
| 4,913,560 A | 4/1990 | Herrington |
| 5,044,776 A | 9/1991 | Schramer et al. |
| 5,123,535 A | 6/1992 | Patnode et al. |
| 5,235,149 A | 8/1993 | Boehrerk |
| 5,265,794 A | 11/1993 | Johnston |
| 5,415,910 A | 5/1995 | Knauf |
| 5,484,167 A | 1/1996 | Donaldson et al. |
| 5,507,428 A | 4/1996 | Robinson, Jr. et al. |
| 5,569,515 A | 10/1996 | Rice, II et al. |
| 5,571,358 A | 11/1996 | Napier et al. |
| 5,832,145 A | 11/1998 | Dais et al. |
| 5,833,368 A | 11/1998 | Kaufman |
| 5,855,435 A | 1/1999 | Chiesa |
| 5,871,096 A | 2/1999 | Yakich |
| 5,902,045 A | 5/1999 | Resteghini |
| 5,910,348 A | 6/1999 | Hart-Smith et al. |
| 5,947,368 A | 9/1999 | Thresher et al. |
| 5,958,486 A | 9/1999 | Ringdahl et al. |
| 5,979,748 A | 11/1999 | Drummond et al. |
| 6,026,953 A | 2/2000 | Nakamura et al. |
| 6,041,929 A | 3/2000 | Brunner et al. |
| 6,047,488 A | 4/2000 | Tuskiewicz |
| 6,056,141 A | 5/2000 | Navarini et al. |
| 6,190,485 B1 | 2/2001 | Cahill et al. |
| 6,196,450 B1 | 3/2001 | Varadarajan et al. |
| 6,206,570 B1 | 3/2001 | Cortopassi |
| 6,234,386 B1 | 5/2001 | Drummond et al. |
| 6,264,098 B1 | 7/2001 | Drummond et al. |
| 6,270,004 B1 | 8/2001 | Drummond et al. |
| 6,302,321 B1 | 10/2001 | Reese et al. |
| 6,328,203 B1 | 12/2001 | Tedford, Jr. |
| 6,334,711 B1 | 1/2002 | Risgalla et al. |
| 6,383,592 B1 | 5/2002 | Lowry et al. |
| 6,428,867 B1 | 8/2002 | Scott et al. |
| 6,460,720 B1 | 10/2002 | Massey et al. |
| 6,497,336 B2 | 12/2002 | Grayer |
| 6,544,613 B2 | 4/2003 | Varadarajan |
| 6,589,622 B1 | 7/2003 | Scott |
| 6,620,275 B1 | 9/2003 | Avila et al. |
| 6,660,353 B2 | 12/2003 | Siedl |
| 6,746,743 B2 | 1/2004 | Knoerzer et al. |
| 6,857,561 B2 | 2/2005 | Williams et al. |
| 6,858,108 B2 | 2/2005 | Matthews et al. |
| 6,890,112 B2 | 5/2005 | Kline |
| 6,991,375 B2 | 1/2006 | Clune et al. |
| 7,144,635 B2 | 12/2006 | Hawes et al. |
| 7,189,300 B2 | 3/2007 | Knoerzer et al. |
| 7,228,961 B2 | 6/2007 | Koetter et al. |
| 7,344,744 B2 | 3/2008 | Sierra-Gomez et al. |
| 7,416,768 B2 | 8/2008 | Knoerzer et al. |
| 7,422,782 B2 | 9/2008 | Haedt et al. |
| 7,608,317 B2 | 10/2009 | Keckeisen et al. |
| 7,686,513 B2 | 3/2010 | Knoerzer et al. |
| 7,717,620 B2 | 5/2010 | Hebert et al. |
| 7,789,236 B2 | 9/2010 | Burgess |
| 7,828,923 B2 | 11/2010 | Patel |
| 7,955,678 B2 | 6/2011 | Stogbauer et al. |
| 8,051,979 B2 | 11/2011 | Smith et al. |
| 8,408,451 B2 | 4/2013 | Adam et al. |
| 8,443,578 B2 | 5/2013 | Sargin et al. |
| 8,544,718 B2 | 10/2013 | Yamato et al. |
| 8,646,975 B2 | 2/2014 | Moehlenbrock et al. |
| 8,740,052 B2 | 6/2014 | Drummond |
| 8,746,490 B2 | 6/2014 | Huffer et al. |
| 9,096,346 B2 | 8/2015 | Huffer |
| 9,278,506 B2 | 3/2016 | McLean |
| 9,850,056 B2 | 12/2017 | Shaw et al. |
| 2003/0178429 A1 | 9/2003 | Williams et al. |
| 2004/0013827 A1 | 1/2004 | Zuser et al. |
| 2004/0064983 A1 | 4/2004 | Joseph |
| 2004/0079763 A1 | 4/2004 | Powell et al. |
| 2005/0031814 A1 | 2/2005 | Dawes |
| 2005/0078890 A1 | 4/2005 | Abe et al. |
| 2005/0109652 A1 | 5/2005 | Goepfert |
| 2005/0153113 A1 | 7/2005 | Hseih et al. |
| 2005/0276525 A1 | 12/2005 | Hebert et al. |
| 2006/0138207 A1 | 6/2006 | Levine et al. |
| 2006/0147129 A1 | 7/2006 | Miller |
| 2006/0198986 A1 | 9/2006 | Keckeisen et al. |
| 2007/0051790 A1 | 3/2007 | Smith et al. |
| 2008/0037911 A1 | 2/2008 | Cole et al. |
| 2008/0044114 A1 | 2/2008 | Hall et al. |
| 2008/0073308 A1 | 3/2008 | Yousif |
| 2008/0240627 A1 | 10/2008 | Cole et al. |
| 2008/0272016 A1 | 11/2008 | Anderson et al. |
| 2009/0194451 A1 | 8/2009 | Leiner et al. |
| 2009/0226117 A1 | 9/2009 | Davis et al. |
| 2009/0274799 A1 | 11/2009 | Lee et al. |
| 2010/0098355 A1 | 4/2010 | Jansen |
| 2010/0111453 A1 | 5/2010 | Dierl |
| 2010/0147724 A1 | 6/2010 | Mitra-Shah et al. |
| 2010/0288760 A1 | 11/2010 | McGrew et al. |
| 2011/0038569 A1 | 2/2011 | Huffer et al. |
| 2011/0049168 A1* | 3/2011 | Loftin ................ B65D 77/2096 156/253 |
| 2011/0089177 A1 | 4/2011 | Thorstensen-Wolf |
| 2011/0204056 A1 | 8/2011 | Veternik et al. |
| 2012/0082764 A1 | 4/2012 | Paterson |
| 2012/0125932 A1 | 5/2012 | Sierra-Gomez et al. |
| 2012/0177307 A1 | 7/2012 | Duan et al. |

(56) References Cited

U.S. PATENT DOCUMENTS

| | | |
|---|---|---|
| 2012/0314979 A1 | 12/2012 | Heininga |
| 2013/0004626 A1* | 1/2013 | Renders .................. B65D 33/02 493/213 |
| 2013/0026170 A1 | 1/2013 | Zerfas et al. |
| 2013/0056470 A1* | 3/2013 | Hallak ............... B65D 75/5855 220/270 |
| 2013/0089280 A1 | 4/2013 | Tseng et al. |
| 2013/0101239 A1 | 4/2013 | Kropf et al. |
| 2013/0114918 A1 | 5/2013 | Lyzenga et al. |
| 2013/0121624 A1* | 5/2013 | Lyzenga ............ B65D 75/5838 383/203 |
| 2013/0279832 A1 | 10/2013 | Burri et al. |
| 2013/0320019 A1 | 12/2013 | Tinoco et al. |
| 2014/0000219 A1 | 1/2014 | Pezzoli |
| 2014/0079343 A1 | 3/2014 | Lyzenga et al. |
| 2014/0270597 A1 | 9/2014 | Friedman et al. |
| 2014/0314339 A1* | 10/2014 | Docherty ........... B65D 75/5838 383/211 |
| 2014/0363545 A1 | 12/2014 | Veternik et al. |
| 2014/0376836 A1 | 12/2014 | Schieber |
| 2015/0158643 A1 | 6/2015 | Coker et al. |
| 2015/0297005 A1 | 10/2015 | Janor |
| 2015/0314938 A1* | 11/2015 | Bomba .................. B65D 75/28 206/459.5 |
| 2015/0353238 A1 | 12/2015 | Moehlenbrock et al. |
| 2016/0009447 A1 | 1/2016 | Rhue |
| 2016/0096667 A1 | 4/2016 | Huffer |
| 2016/0122109 A1* | 5/2016 | Clark ................. B65D 75/5838 220/23.4 |
| 2016/0130041 A1 | 5/2016 | Giorgio et al. |
| 2016/0167860 A1 | 7/2016 | Tomsovic et al. |
| 2016/0227835 A1 | 8/2016 | Swede |
| 2016/0236844 A1 | 8/2016 | Gagne et al. |
| 2016/0288960 A1 | 10/2016 | Branyon |
| 2016/0343275 A1 | 11/2016 | Huffer et al. |
| 2017/0121086 A1 | 5/2017 | Hartley |
| 2017/0121088 A1 | 5/2017 | Rhue |
| 2017/0283149 A1 | 10/2017 | Rhue |
| 2017/0345344 A1 | 11/2017 | Huffer et al. |
| 2019/0047266 A1* | 2/2019 | Blyth ..................... B32B 3/266 |

FOREIGN PATENT DOCUMENTS

| | | |
|---|---|---|
| DE | 8903067 | 7/1989 |
| EP | 0 488 967 A1 | 6/1992 |
| EP | 0488967 A1 | 6/1992 |
| EP | 0499647 B1 | 1/1995 |
| EP | 0952087 A2 | 10/1999 |
| EP | 1080874 | 3/2001 |
| EP | 1477408 A1 | 11/2004 |
| EP | 1770025 A2 | 4/2009 |
| FR | 1 514 374 A | 2/1968 |
| FR | 2 463 468 A1 | 2/1981 |
| GB | 2147564 A | 5/1985 |
| GB | 2491646 A | 12/2012 |
| JP | 2000 203654 A | 7/2000 |
| JP | 2000229681 A | 8/2000 |
| JP | 2013 147269 A | 8/2013 |
| JP | 2013151329 A | 8/2013 |
| JP | 2017039494 A | 2/2017 |
| WO | WO 95/29097 A1 | 11/1995 |
| WO | WO 96/25333 A1 | 8/1996 |
| WO | WO 98/28728 | 7/1998 |
| WO | WO 03/062090 A1 | 7/2003 |
| WO | WO 2006/093898 A1 | 9/2006 |
| WO | WO 2008/086389 A2 | 7/2008 |
| WO | WO 2012/036765 A1 | 3/2012 |
| WO | WO 2014/186572 A2 | 11/2014 |
| WO | WO 2015/009658 A2 | 1/2015 |

OTHER PUBLICATIONS

"Innovations for opening and closing"; Food Trade Review; Oct. 1993; vol. 63, No. 4 (3 pgs.).
Kate Bertrand; "Improve security through packaging: emerging technologies can help create a package that safeguards products from tampering and protects your brand from counterfeiting"; Food Processing; Feb. 2006; vol. 67, No. 2 (5 pgs.).
U.S. Appl. No. 15/656,481, entitled "Tamper Evident Hybrid Resealable Container", filed Jul. 21, 2017.
U.S. Appl. No. 15/807,200, entitled "Membrane Lid With Integrated Peelable Portion", filed Nov. 8, 2017.
U.S. Appl. No. 15/676,167, entitled "Flexible Laminate for Packaging With Integrated Peelable Portion", filed Aug. 14, 2017.
LPS Industries, Loc n Press Pressure Sensitive Zippered Envelopes, www.lpsind.com, accessed Apr. 1, 2015.
ITC, Custom Adhesive Tape Manufacturing & Design, www.itctapes.com, accessed Feb. 2, 2015.
ClearBags, Value Crystal Clear Bags, www.clearbags.com, accessed Apr. 1, 2015.
Office Action for corresponding Canadian Patent Application No. 2,847,432 dated Nov. 25, 2014.
Final Office Action for U.S. Appl. No. 14/928,489 dated Mar. 22, 2018.
International Search Report and Written Opinion of the International Searching Authority for International Application No. PCT/US2017/064594 dated Mar. 27, 2018.
Non-final Office Action for U.S. Appl. No. 14/676,390 dated Apr. 27, 2018.
Non-final Office Action for U.S. Appl. No. 14/871,398 dated May 2, 2018.
International Search Report and Written Opinion of the International Searching Authority for International Application No. PCT/US2018/054170 dated Nov. 27, 2018.
Canadian Patent Application No. 3,006,160, filed May 25, 2018, Canadian Office Action dated Apr. 2, 2019.
U.S. Appl. No. 15/807,200, entitled "Membrane Lid With Integrated Peelable Portion," filed Nov. 8, 2017, Non-Final Office Action dated May 31, 2019.
Non-Final Office Action for U.S. Appl. No. 15/807,200 dated Nov. 18, 2019.
European extended search report dated Aug. 4, 2021 for EP Application 21180691.4; 5 pages.
Japanese Office Action for JP Application No. 2019-544701, English Translation included; dated Nov. 24, 2021; 9 pages.

* cited by examiner

RESEALABLE FLEXIBLE PACKAGING

FIELD OF THE INVENTION

The present invention relates generally to resealable flexible packaging.

SUMMARY OF THE INVENTION

According to an aspect, the present invention provides a flexible packaging comprising a substrate base layer and a film layer at least partially releasably affixed to the substrate base layer via a pressure sensitive adhesive layer, wherein the pressure sensitive adhesive layer comprises at least one adhesive zone, and at least one adhesive-free zone extending continuously in a machine direction, and wherein the film layer is scored to form at least one pull tab which is disposed within the at least one adhesive-free zone, and wherein the substrate base layer is scored to form at least one cavity which is disposed adjacent the at least one adhesive-free zone.

According to another aspect, the present invention also provides a flexible packaging comprising a substrate base layer; and a film layer at least partially releasably affixed to the substrate base layer via a pressure sensitive adhesive layer, wherein the pressure sensitive adhesive layer comprises at least one adhesive zone, and at least one adhesive-free zone extending continuously in a machine direction, and disposed in the center of the film layer; wherein the film layer is scored to form a pull tab which is disposed within the at least one adhesive-free zone, wherein the pull tab is scored down the center, such that it can be separated into two pull tabs; wherein the film layer is scored to form two resealable flaps which are continuous with each of the two pull tabs; and wherein the substrate base layer is scored to form two cavities which are disposed on opposite sides of the at least one adhesive-free zone and are aligned with the two resealable flaps.

According to yet another aspect, the present invention also provides a method for forming a flexible packaging comprising providing a substrate base layer in sheet form; providing a film layer in sheet form; laminating the substrate base layer to the film layer using a pressure sensitive adhesive, wherein the pressure sensitive adhesive is disposed such that it creates an adhesive zone and an adhesive-free zone between the base layer and the film layer, and wherein the adhesive-free zone extends continuously in a machine direction; scoring the film layer to form at least one pull tab within the adhesive-free zone and at least one resealable flap which is continuous with the at least one pull tab; and scoring the base layer to form at least one cavity which is aligned with the resealable flap.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

A variety of food and non-food products are packaged using flexible packaging materials formed primarily of laminations of one or more of polymer films, metallized polymer films, paper, metal foil, and the like. In many instances, packages contain products that may be used or consumed a little at a time, and the products may be susceptible to being adversely affected (e.g., becoming soggy, drying out, etc.) by exposure to the surrounding environment. Accordingly, there is a desire to be able to reclose a package after its initial opening to keep the product that remains in the package fresh.

Various opening and reclose arrangements have been developed for flexible packaging. Often, reclosability is achieved by using a pressure-sensitive adhesive label that is attached to the exterior of the product package, adjacent the location where the package is opened. Such labels are often formed separately from the packaging structure and are then added to the packaging structure. These types of labels typically include a release liner, designed to protect the adhesive layer of the label until its application onto the packaging structure. This release liner must be removed and discarded upon application onto the packaging structure, creating unnecessary waste and expense. Additionally, separately-formed lined labels typically must have a stiffness which is sufficient to dispense the label at an angle which is ninety (90) degrees from the separation point of the release liner. This limits the thinness with which the label can be made.

Alternatively, transfer tapes can be utilized to adhere a label to a packaging film or structure without the use of a liner. Transfer tapes are typically applied to a packaging structure in the machine direction, on the center of a web. After lamination of the transfer tape and packaging structure, the transfer tape and packaging structure can be respectively scored from top and bottom to form a resealable label.

However, variability in the repeat lengths of the packaging structure and the label as well as the extensibility of the web substrates often causes inconsistencies in registering the pattern-applied adhesion zones of the transfer tape against the graphics on the surface of the packaging structure. To ensure proper registry of the transfer tape and the packaging structure, packaging manufacturing processes often require the use of a servomechanism to error sense and correct.

In contrast, in an embodiment, the present invention comprises a linerless film or transfer tape that does not require registry in the machine direction during application to a packaging material. The film or transfer tape comprises an adhesive-free zone which is continuous in the machine direction. The film or transfer tape may by adhered to a separate rollstock film, using a pressure sensitive adhesive to form a laminated film. The laminated film may then be scored, from top and bottom, to create a flexible packaging which comprises a resealable flap that covers an opening in the flexible packaging and a cavity in the package body. The flexible packaging can then be used to form a package. By using a pull tab which is aligned with the adhesive-free zone, the end user can lift the resealable flap away from the package, remove any desired contents from the package, and then press the resealable flap back onto the package to re-adhere the flap to the package through the use of the pressure sensitive adhesive, thereby resealing the package. The package can thus be repeatedly opened and resealed.

The package, flexible packaging, laminated film, and transfer tape of the present invention can be used in connection with the packaging of food and non-food products. In various examples, the inventive packages, flexible packaging, laminated film, and transfer tape may be used to store cookies, crackers, dry goods, cleaning products, or any other products which may be opened and resealed, and would be susceptible to being adversely affected by exposure to the surrounding environment.

Figure 1A:
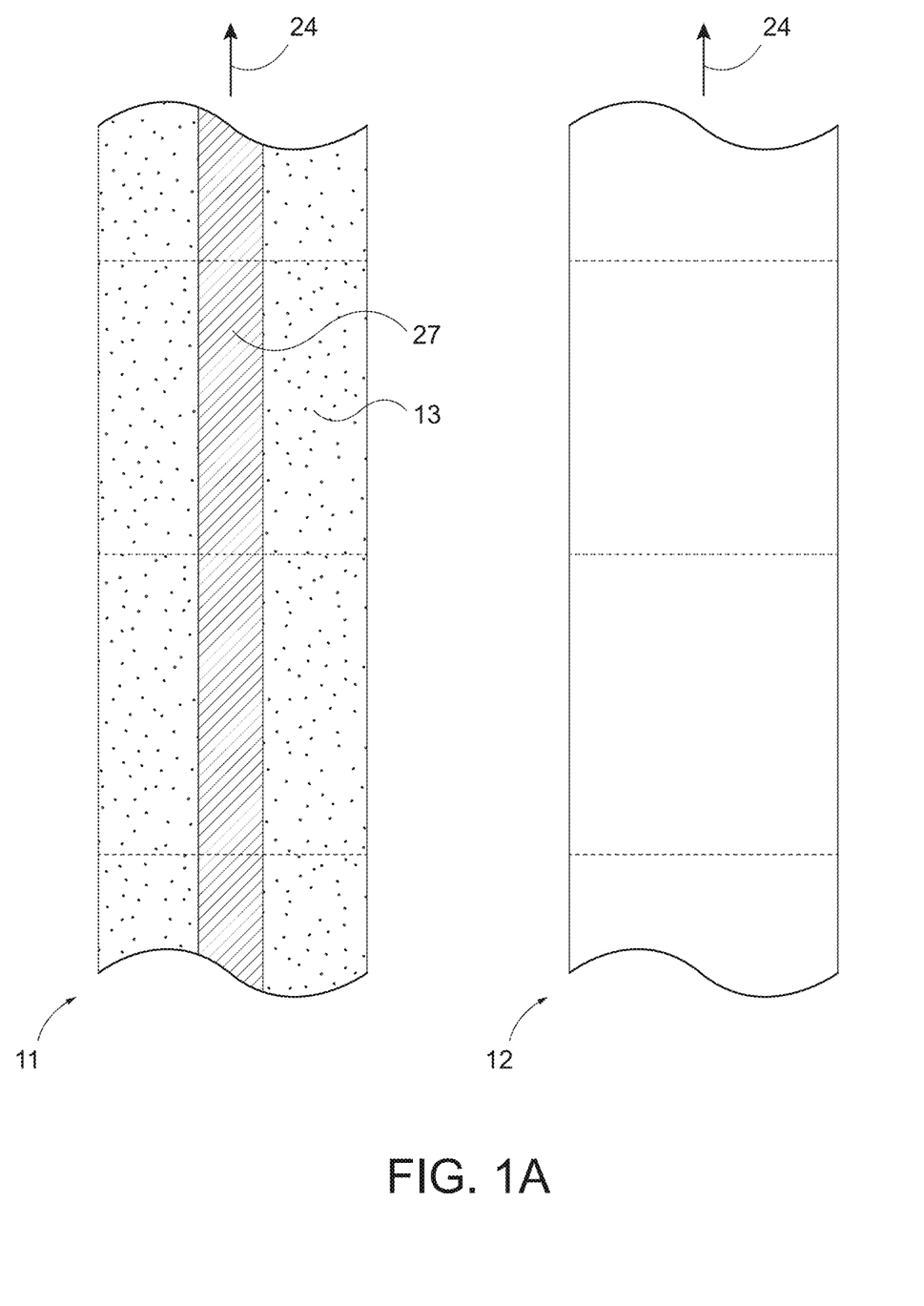
FIG. 1A is a top view of an embodiment of a transfer tape and rollstock layer of the present invention.

Turning to the drawings, FIG. 1A illustrates a top view, in an embodiment, of the transfer tape 11 and the substrate base layer (also referred to herein as rollstock) 12 of the invention. The transfer tape 11 may have an adhesive-free zone 27 and one or more adhesive 13 zones. In certain embodiments, the adhesive-free zone 27 of the transfer tape 11 is continuous in the machine direction 24. In an embodiment, the transfer tape 11 and the rollstock 12 are laminated together to form the laminated film 10.

Figure 1B:
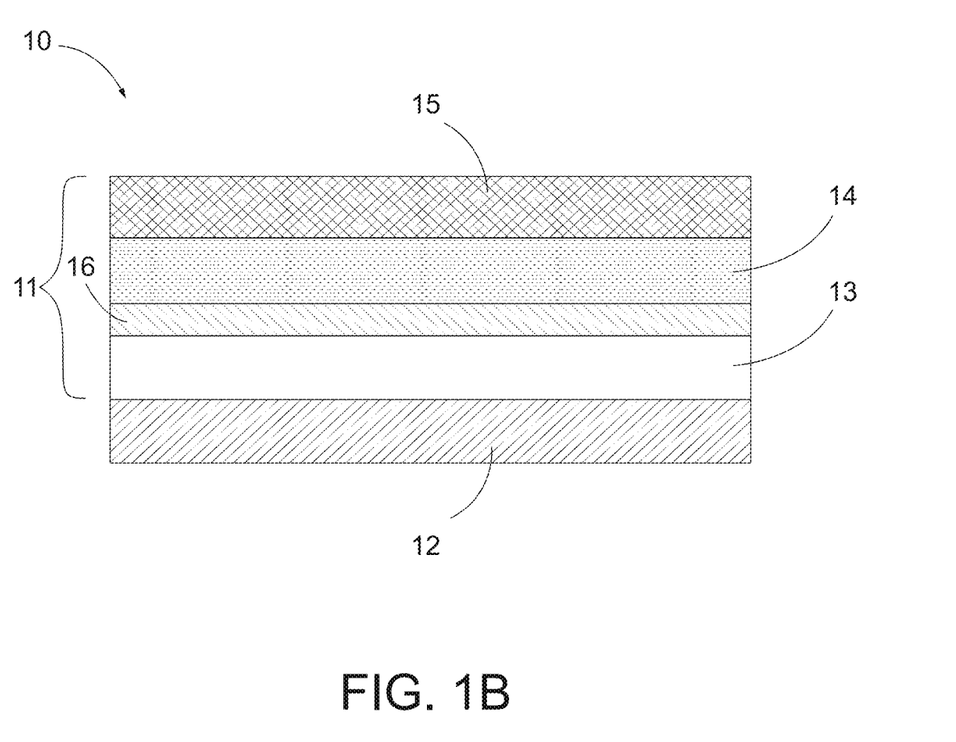
FIG. 1B is a cross sectional view of an embodiment of a laminated film of the present invention.

As is shown in the cross-sectional view of FIG. 1B, in an embodiment, the laminated film 10 of the present invention may comprise a number of layers. In one embodiment, the laminated film 10 comprises the transfer tape 11 and a rollstock layer 12. The transfer tape 11 may additionally comprise a number of layers.

In an embodiment, the topmost or outermost layer of the transfer tape 11 may comprise an optional release coating 15. In an embodiment, the release coating 15 may be utilized if the transfer tape 11 is applied to the rollstock 12 offline. In this embodiment, the release coating 15 may be applied to the topside of a film 14 and may be designed to ensure the stable unwinding of the transfer tape 11 during application to the rollstock 12.

In another embodiment, however, the transfer tape 11 is applied to the rollstock 12 on press. In this embodiment, the transfer tape 11 may or may not comprise a release coating 15. In the event the transfer tape 11 does not comprise a release coating 15, the film 14 may comprise additives which serve as a release.

The film 14 may comprise any flexible packaging film known in the art, including but not limited to, polymer films, metalized polymer films, papers, metal foils, polyester films, polyolefin films, polyethylene terephthalate (PET) polypropylene (OPP), metalized polyester (MPET), any combination thereof, or any other suitable film known in the art. In various embodiments, the film 14 may be a multi-layer film. In an embodiment, the film 14 comprises a pre-printed film.

As part of the transfer tape 11, the film 14 may be adjacent, on its bottom side, an optional primer layer 16. The primer layer 16 may be designed to increase the holding power of any adhesive 13 utilized in the transfer tape 11. In an embodiment, the primer layer 16 can be a liquid substance coated onto the bottom side of the film 14 and/or onto the top side of the rollstock 12. In other embodiments, the primer layer 16 may comprise a physical treatment, such as corona or flame treatment, applied to the bottom side of the film 14 and/or the top side of the rollstock 12.

The bottom side of the transfer tape 11 may be releasably affixed, in areas, to the top side of a rollstock 12 through use of an adhesive 13. In an embodiment, the bottom side of the film layer 14 (or optional primer layer 16, as the case may be) of the transfer tape 11 is affixed in this manner to the rollstock 12. In some embodiments, adhesive 13 may comprise a pressure sensitive adhesive ("PSA"). Any suitable PSA known in the art may be utilized in the present invention. For example, the adhesive 13 may comprise an acrylic, a natural rubber, a synthetic rubber, a silicone, a butyl, or an ethylenevinylacetate ("EVA").

In an embodiment, a PSA 13 is selected such that it releasably secures the transfer tape 11 or film 14, as the case may be, to the rollstock 12 in certain areas. Optionally, one or more adhesives 13 may be utilized, wherein the adhesives 13 allow the bonding of the transfer tape 11 or film layer 14, as the case may be, to the rollstock 12 at different levels of affinity. For example, an adhesive 13 having a greater bonding affinity may be selected and utilized to adhere the transfer tape 11 or film 14, as the case may be, to the rollstock 12 in certain areas wherein the tamper-evident indicators 20 are positioned. The use of the adhesive 13 to secure the transfer tape 11 or film 14, as the case may be, to the rollstock 12 creates the laminated film. In an embodiment, the adhesive 13 utilized allows transfer tape 11 or film 14, as the case may be, and rollstock 12 to be separated and resealed multiple times by the end user.

In an embodiment, the rollstock 12 may comprise any flexible packaging film known in the art, including but not limited to, polymer films, metalized polymer films, paper, metal foil, polyester film, polyolefin film, PET, OPP, MPET, any combination thereof, or any other suitable film known in the art. In various embodiments, the rollstock 12 may be a multi-layer film. In an embodiment, the rollstock 12 comprises a pre-printed flexible packaging material. In an embodiment, the rollstock 12 and film 14 comprise the same material.

In an embodiment, the laminated film 10 layers comprise, in order from interior to exterior, rollstock 12, adhesive 13, an optional primer layer 16, a film layer 14, and an optional release coating 15 as the exterior or outermost layer.

In certain embodiments, the laminated film 10 of the invention may additionally comprise a barrier layer, providing a barrier against the passage of oxygen and/or moisture. In other embodiments, the laminated film 10 may additionally comprise one or more metallization layers or foil layers, which may be helpful in preventing a laser or die cutting machine from penetrating through the entire thickness of the film 14 or the rollstock 12.

Figure 2:
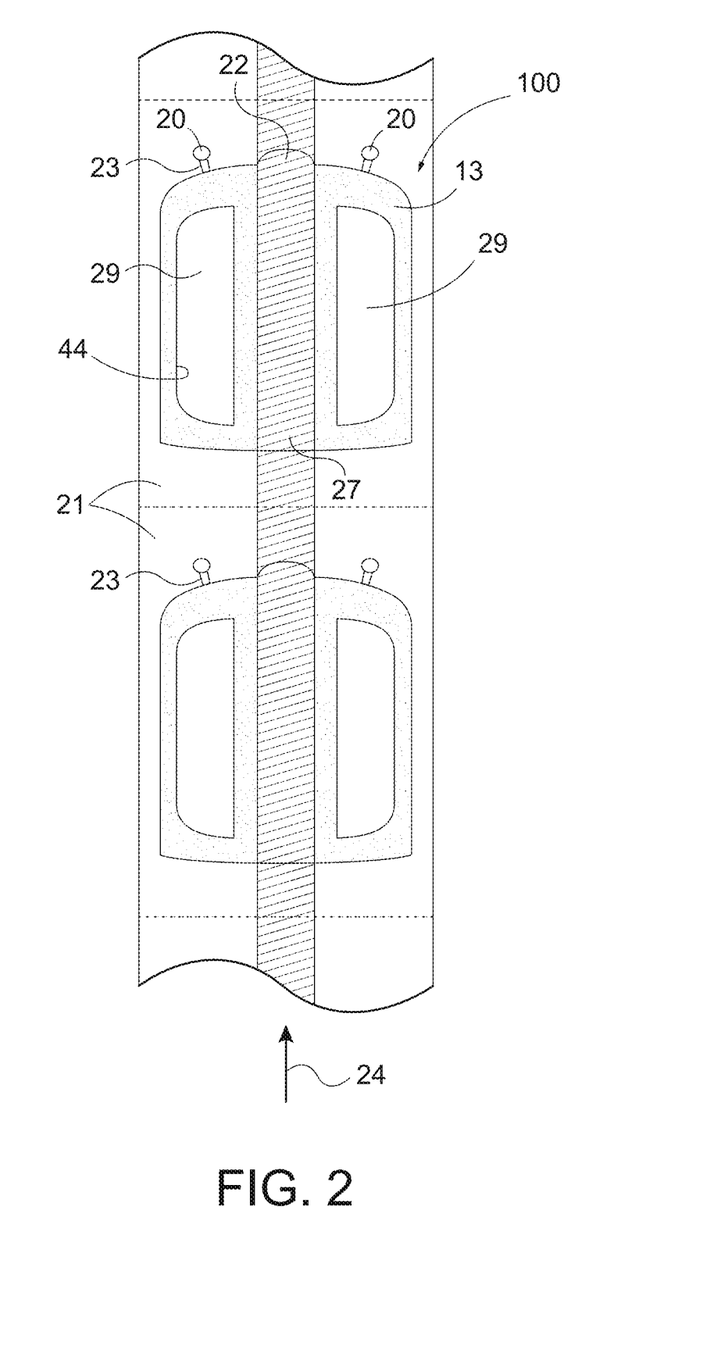
FIG. 2 is a top view of an embodiment of flexible packaging of the present invention.
Figure 3:
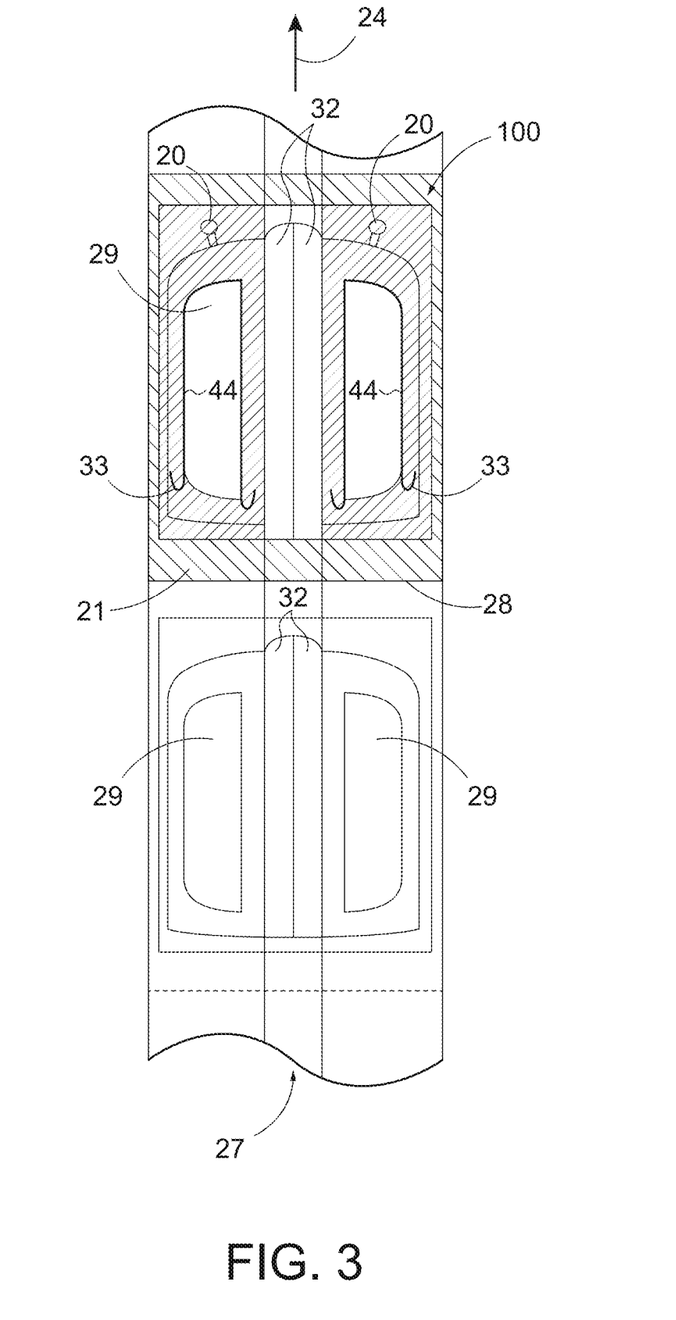
FIG. 3 is a top view of another embodiment of flexible packaging of the present invention.

FIG. 2 illustrates a flexible packaging 100 of the invention, wherein the laminated film 10 has been scored. As shown in FIGS. 1A and 2, in an embodiment of the invention, the flexible packaging 100 may comprise an adhesive-free zone 27 between the transfer tape 11 or film 14 and the rollstock 12. In an embodiment, the adhesive-free zone 27 may be disposed continuously in the machine direction 24. In this embodiment, the adhesive-free zone 27 may be disposed continuously through both the flexible packaging 100 and a matrix or skeleton 21, which may surround the flexible packaging 100 while in manufacture. In this embodiment, because the adhesive-free zone 27 is disposed continuously in the machine direction 24, no registration is required in the machine direction 24. In another embodiment, the adhesive-free zone 27 may be non-continuous through the flexible packaging 100 and/or matrix 21.

In an embodiment, the transfer tape 11 is designed such that it contains a continuous adhesive-free zone 27, in the machine direction 24. Thus, when the transfer tape 11 is applied to the rollstock 12, there is no adhesive between the two layers (the transfer tape 11 and the rollstock 12) in the adhesive-free zone 27.

In an embodiment, the adhesive-free zone 27 may be disposed in the center of the flexible packaging 100, in the machine direction 24. In this embodiment, the pull tab 22, 32 may also be disposed in the center of the flexible packaging 100, aligned with the adhesive-free zone 27. In this embodiment, the flexible packaging 100 and, respectively, the pull tab 22, 32 may be aligned in the machine direction 24, such that if the pull tab 22, 32 and resealable flap 42 were lifted to reveal the cavity 29, 62, such lifting would occur in the machine direction 24, as shown in FIGS. 2-5. In this embodiment, the flexible packaging 100 may have at least two cavities 29. In this embodiment, the width of the adhesive-free zone 27 may be equivalent to or less than the distance between the at least two cavities 29.

Figure 6:
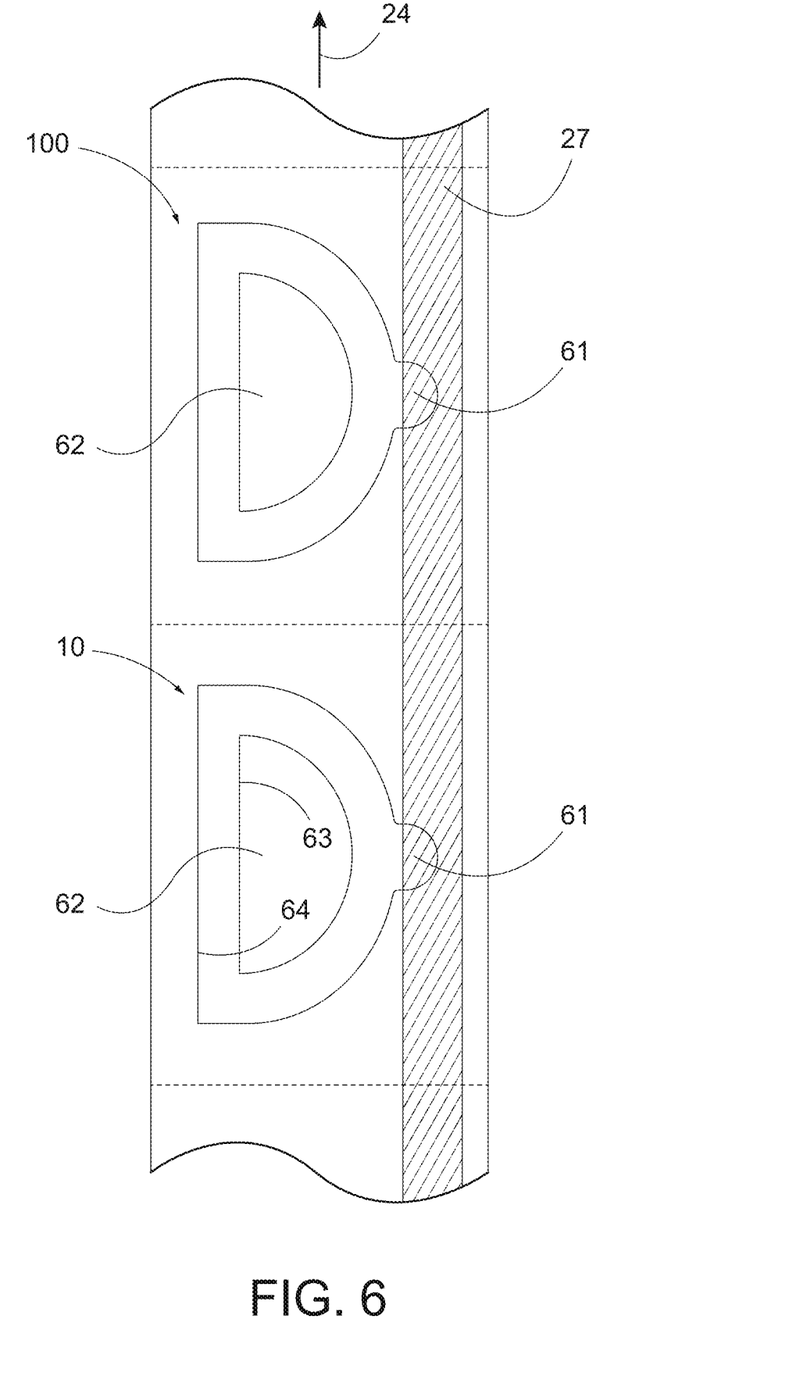
FIG. 6 is a top view of another embodiment of flexible packaging of the present invention.

In other embodiments, the adhesive-free zone 27 may be disposed in any position, left to right, within the confines of the flexible packaging 100. In a particular embodiment, the adhesive-free zone 27 is disposed left or right of center, in the machine direction 24, and is continuous (shown in FIG. 6). In this embodiment, the pull tab 61 may also be disposed left or right of center, in the machine direction, and may be aligned with the adhesive-free zone 27. In a particular embodiment, the flexible packaging 100 and, respectively, the pull tab 61 may be aligned perpendicular to the machine direction 24, such that if the pull tab 61 and corresponding resealable flap were lifted to reveal the cavity 62, such lifting would occur perpendicular to the machine direction 24, as shown in FIG. 6. In an embodiment, multiple adhesive-free zones 27 are present within the flexible packaging 100.

In an embodiment, the adhesive-free zone 27 may be formed by deadening or deactivating any adhesive 13 that has been applied, using any method known in the art. In another embodiment, the adhesive-free zone 27 may be formed by pattern-applying the adhesive 13 to the transfer tape 11 or film 14 to create one or more adhesive-free zones 27. In this embodiment, the adhesive 13 may be pattern-applied in a continuous manner, in the machine direction 24, essentially creating one or more adhesive lanes which define at least one continuous adhesive-free zone 27 in the machine direction 24. In another embodiment, the adhesive 13 may be pattern applied selectively to define alternating adhesive portions and non-adhesive portions within the linerless label 10. In an embodiment, the adhesive-free zone 27 is created prior to application or lamination of the transfer tape 11 to the rollstock 12.

In an embodiment, the flexible packaging 100 may additionally comprise tamper-evident indicators 20. The tamper evident indicators 20 may comprise any form known in the art used to indicate whether a package has been previously opened or whether the integrity of the package has been compromised. In an embodiment, any tamper evident indicators 20 known in the art may be utilized herein, as long as they provide an uninterrupted film area that remains on the package 40 when it is opened. In an embodiment, the tamper evident indicators 20 may include an area of weakness created, for example, by a scored, perforated, or thinned line or by forming the tamper evident indicator out of a highly oriented material that has a tendency to split along the break line. For example, FIG. 2 illustrates a perforation 23 in the tamper evident indicators 20 which creates an area of weakness such that the tamper evident indicators 20 will tend to split along the perforation 23, leaving the upper portion of the tamper evident indicators 20 on the package 40 when it is opened. In an embodiment, the invention utilizes tamper-evident indicators 20 as more fully described in U.S. patent application Ser. No. 15/017,743 to Gagne, which is incorporated by reference herein in its entirety.

As is further shown in FIGS. 2-5, in an embodiment, the flexible packaging 100 and package 40 may define multiple cavities 29 for storage of food or other products. In this embodiment, for example, there may be separate cavities 29 on the left and right side of the package 40, optionally separated by an internal divider.

Figure 4:
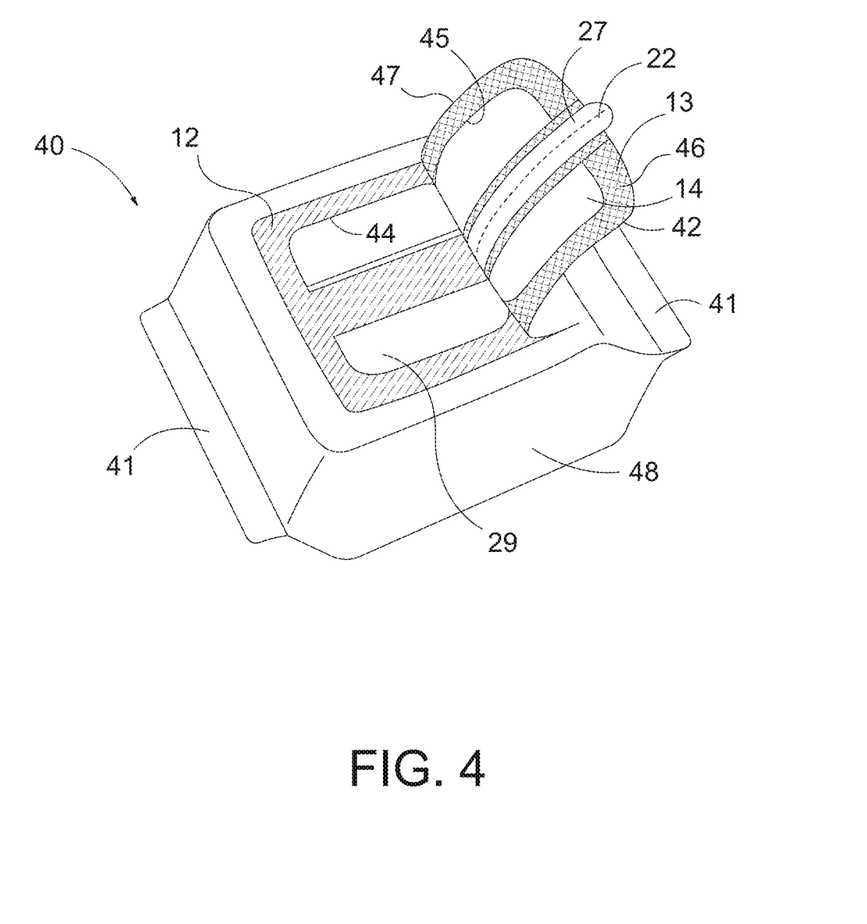
FIG. 4 is a perspective view of an embodiment of a package of the present invention.

In an embodiment shown in FIGS. 2 and 4, the flexible packaging 100 may comprise a single pull tab 22. In this embodiment, use of the single pull tab 22 will open both cavities 29 simultaneously. In another embodiment, the flexible packaging 100 may comprise a dual, or split, pull tab 32 (shown in FIGS. 3 and 5). In this embodiment, both sides of pull tab 32 may be pulled simultaneously to simultaneously open each of the cavities 29. Alternatively, in an embodiment, pull tab 32 may be separated into two split pull tabs, each corresponding to a separate cavity 29. Each of the split pull tabs 32 may be pulled independently to independently open its respective cavity 39. In this embodiment, the product contained within each cavity 29 may be separately accessed and the flap resealed, preserving the contents of each cavity 29 more effectively.

Method of Manufacture

In an embodiment, to make the laminated film 10, flexible packaging 100, and package 40, in a first step, PSA 13 (optionally, having varying levels of bonding affinity) may be applied between the or film 14 and rollstock 12 in predetermined patterns, leaving an adhesive-free zone 27. Alternatively, a transfer tape 11 may be created offline by applying the PSA 13 (optionally, having varying levels of bonding affinity) to the film 14, in predetermined patterns, leaving an adhesive-free zone 27. In either embodiment, the film 14 (or transfer tape 11, as the case may be) and the rollstock 12 may then be laminated together to create the laminated film 10.

Once the laminated film 10 is formed, precise scoring operations (laser, die cut, or any other method known in the art) may be performed on either side of the laminated film 10. Notably, the scoring operations need not be in registration with the adhesive patterns due to the continuous adhesive-free zone 27. In an embodiment, each scoring operation only penetrates through one layer of the laminated film 10.

More specifically, the laminated film 10, flexible packaging 100, and package 40 may be made, in an embodiment, in the following manner:

First, film 14 and rollstock 12 may be provided in sheet form (shown in FIG. 1A). PSA 13 may be pattern applied to the bottom surface 46 of the film 14 in a predetermined area.

The pattern may be any suitable pattern but, in an embodiment, leaves at least one continuous adhesive-free zone 27 in the machine direction 24 of the film 14. The PSA 13 may be dried at a drying station such as an oven or the like.

In an embodiment, an adhesive having a greater level of bonding affinity than the PSA 13 may be pattern applied onto the bottom surface 46 of the film 14 in a predetermined area, such that the adhesive having an increased affinity does not cover the PSA 13, does not cover the area in which the pull tab 22 (or 32) will be scored, and leaves at least one continuous adhesive-free zone 27 in the machine direction 24 of the film 14. Alternatively, a transfer tape 11 may be separately prepared in accordance with the above.

Figure 7:
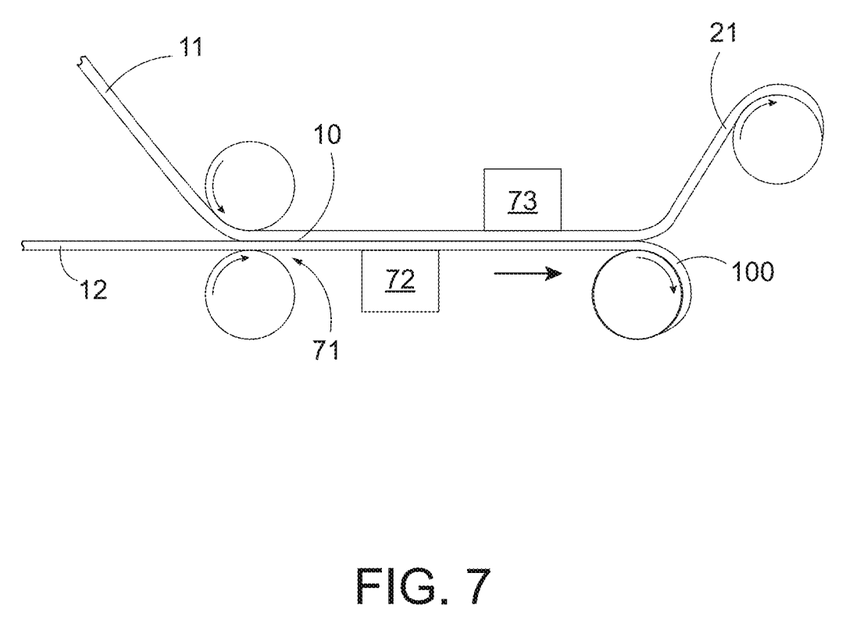
FIG. 7 is a schematic view of flexible packaging made in an embodiment of the present invention.

Next, as shown in FIG. 7, the film 14 or transfer tape 11 and the rollstock 12 are adhesively joined 71 via the PSA 13 to form the laminated film 10. This may be accomplished using a laminating machine comprising two rollers forming a nip therebetween. In an embodiment, the film 14 and the rollstock 12 should be substantially coextensive with each other during the laminating process. For example, if the film 14 and the rollstock 12 are rectangular, the width and length of the film 14 should match the width and length of the rollstock 12. The laminated film 10 may be rectangular or any shape suitable for forming the desired flexible package 40.

Next, a roll of the laminated film 10 is fed to a first scoring station 72 where an undercut 44, 63 may be scored in the rollstock 12. The undercut 44, 63 may be formed with a laser, with a die cutting machine or by any suitable means and may extend through the entire thickness or almost the entire thickness of the rollstock 12. In an embodiment, the undercut 44, 63 may define two or more cavities 29. In an embodiment, the undercut 44, 63 is in registration with the inside border 45 of the PSA pattern. Package integrity features 20 may be cut into the rollstock 12 during this step well. In an embodiment, the undercut 44 may include a hinge 33 (shown in FIG. 3) such that upon opening the label, the label flap will hinge between the die-cuts and remain adhered to the package. In an embodiment, the hinge 33 may be an undercut "j-hook" hinge or an overcut back hinge, but it should be understood that any mechanism which creates a stopping point that inhibits the complete removal of the label flap from the product package could be utilized.

The roll of laminated film 10 may then be fed to a second scoring station 73 where an overcut 28, 64 is formed in an outer facing surface of the film 14. The overcut 28, 64 preferably is formed substantially in registration with the outside border 47 of the PSA 13, although it may overlap the PSA 13. The overcut 28, 64 may be formed with a laser, with a die cutting machine or by any suitable means and may extend through the entire thickness or almost the entire thickness of the film 14. The completion of the undercut 44, 63 and overcut 28, 64 create the flexible packaging 100. In an embodiment, at this point the matrix or skeleton 21 surrounding the flexible packaging 100 may be removed and discarded.

The flexible packaging 100 can then be rolled up for use in creating packages 40. For example and without limitation, the flexible packaging 100 can be used to wrap cookies or crackers at a cookie or cracker making facility. After the contents are placed inside the flexible packaging 100, one or both ends 41 may be sealed to create the filled package 40. The sealing may be accomplished by crimping, folding or otherwise closing off the ends 41 and then exposing the ends 41 to a temperature sufficient to at least partially melt the flexible packaging 100 so that it fuses or welds together to form a heat seal if heat sealing is used. Alternatively, and without limitation, the ends 41 may be sealed using cold sealing.

Method of Use

Figure 5:
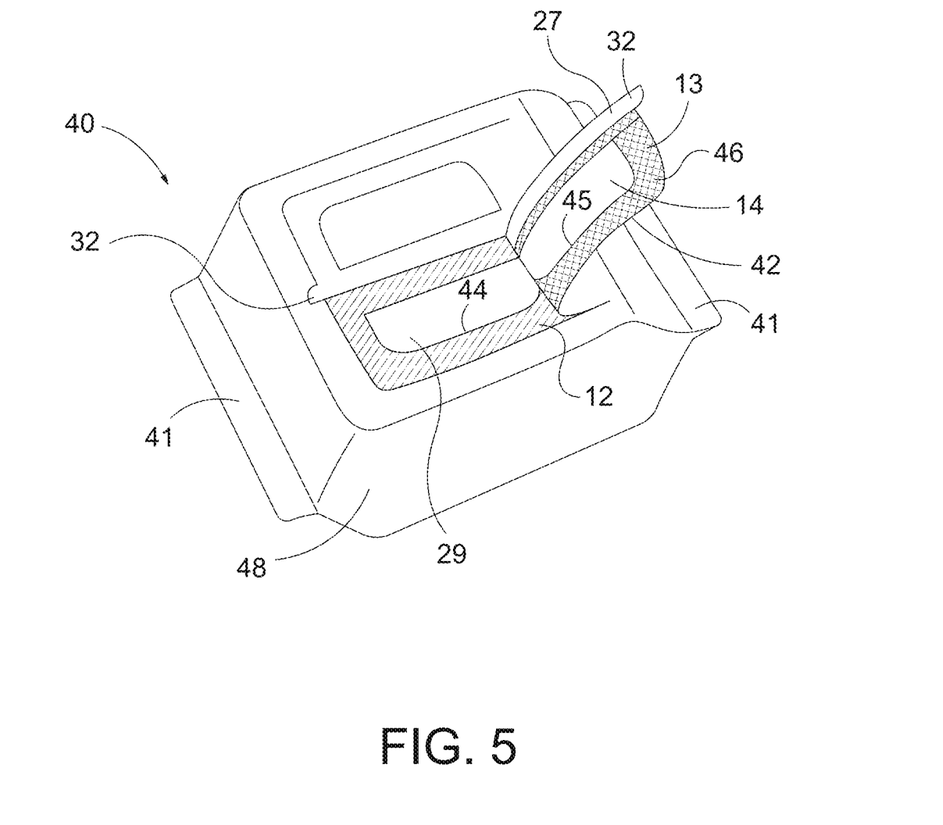
FIG. 5 is a perspective view of another embodiment of a package of the present invention.

FIGS. 4-5 are perspective views of embodiments of packages 40 of the present invention. The flexible package 40 can be opened by pulling the singular pull tab 22 (FIG. 4) formed in the film 14 but not adhered to the rollstock 12. The resealable flap 42 releases from rollstock 12 due to the limited adhesion of the pressure sensitive adhesive 13. More specifically, the film 14 will break along the overcut 28 as the pull tab 22 is lifted, releasing the part of the film 14 adhered to the rollstock 12 via the PSA 13. This process opens at least one cavity 29 in the package 40, due in part to the presence of the undercut 44, through which the contents can be accessed. The peeling back of the resealable flap 42 serves to create the cavity 29 by removing a part of the rollstock layer 12 as the film layer 14 is removed or peeled back. Thus, the undercut 44 defines a location of the cavity 29 of the package 40 and is formed inwardly of the overcut 28 on the resealable flap 42. In FIGS. 4-5, the user has pulled back the resealable flap 42 to reveal the cavity 29 defined by the undercut 44.

Similarly, the flexible package 40 shown in FIG. 5 can be opened by pulling either of the separated pull tabs 32 formed in the film 14 but not adhered to the rollstock 12. The either side of the resealable flap 42 releases from rollstock 12 due to the limited adhesion of the pressure sensitive adhesive 13. This may open one of the multiple cavities 29 in the package 40, due in part to the presence of the undercut 44, through which the contents can be accessed.

In some embodiments, the pull tab 22, 32 may be defined by the overcut 28, 64 to have a semi-circular or semi-elliptical shape that extends outwardly from the general shape of the rest of the overcut 28, 64. In an embodiment, the inner surface of the pull tab 22, 32 and the corresponding outer surface of the rollstock 12 may be devoid of any adhesives, such that the pull tab 22, 32, 61 may be easily separated from the package 40 (e.g., by the user sliding a finger between the pull tab 22, 32, 61 and the rest of the package 40). In this way, the user may grasp the pull tab 22, 32 and use it to pull the resealable flap 42 away from the package body 48 of the package 40, as illustrated in FIGS. 4-5.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A flexible packaging comprising:
    a substrate base layer; and
    a film layer at least partially releasably affixed to the substrate base layer via a pressure sensitive adhesive layer, the pressure sensitive adhesive layer comprising:
        at least one adhesive zone, and
        at least one adhesive-free zone, wherein the at least one adhesive-free zone extends continuously along an entire length of the packaging, in a machine direction, in a lane having continuously parallel edges;

wherein the film layer is scored to form at least one pull tab which is disposed within the at least one adhesive-free zone; and wherein the substrate base layer is scored to form at least one cavity which is disposed adjacent the at least one adhesive-free zone.

2. The flexible packaging of claim 1, wherein the film layer is scored to form at least one resealable flap continuous with the at least one pull tab.

3. The flexible packaging of claim 2, wherein the resealable flap may be separated from the base layer and resealed to the base layer, via the pressure sensitive adhesive.

4. The flexible packaging of claim 2, wherein the pull tab and resealable flap are aligned to be lifted in the machine direction.

5. The flexible packaging of claim 1, wherein the at least one adhesive-free zone is disposed continuously, in the machine direction, in the approximate center of the film layer.

6. The flexible packaging of claim 5, wherein at least two cavities are scored in the base layer, each cavity being disposed adjacent to opposite sides of the at least one adhesive-free zone.

7. The flexible packaging of claim 6, wherein the film layer is scored to form at least two resealable flaps continuous with at least two pull tabs.

8. The flexible packaging of claim 7, wherein the at least two resealable flaps are resealably affixed, via the pressure sensitive adhesive layer, to a portion of the substrate base layer defining the at least two cavities.

9. The flexible packaging of claim 6, wherein the at least one continuous adhesive-free zone is disposed between the two cavities and has a width which is less than the distance between the two cavities.

10. The flexible packaging of claim 1, wherein the at least one adhesive-free zone is disposed continuously, in the machine direction, left or right of center of the film layer.

11. The flexible packaging of claim 10, wherein the film layer is scored to form at least one resealable flap which is continuous with the at least one pull tab, and wherein both the pull tab and resealable flap are aligned to be lifted in a direction which is approximately perpendicular to the machine direction.

12. The flexible packaging of claim 1, additionally comprising tamper-evident indicators.

13. A flexible packaging comprising:
a substrate base layer; and
a film layer at least partially releasably affixed to the substrate base layer via a pressure sensitive adhesive layer, the pressure sensitive adhesive layer comprising:
at least one adhesive zone, and
at least one adhesive-free zone, wherein the at least one adhesive-free zone extends along an entire length of the packaging, continuously in a machine direction, and wherein at least one adhesive-free zone is disposed in the center of the film layer;
wherein the film layer is scored to form a pull tab which is disposed within the at least one adhesive-free zone, and wherein the pull tab is scored down its center, such that it can be separated into two pull tabs;
wherein the film layer is additionally scored to form two resealable flaps which are continuous with each of the two pull tabs; and
wherein the substrate base layer is scored to form two cavities which are disposed on opposite sides of the at least one adhesive-free zone and are aligned with the two resealable flaps.

14. The flexible packaging of claim 13, wherein the at least one adhesive zone is disposed such that it releaseably affixes the resealable flaps to a portion of the substrate base layer defining the two cavities.

15. A method for forming a flexible packaging comprising:
providing a substrate base layer;
providing a film layer;
laminating the substrate base layer to the film layer using a pressure sensitive adhesive, wherein the pressure sensitive adhesive is disposed such that it creates an adhesive zone and at least one adhesive-free zone between the base layer and the film layer, and wherein the at least one adhesive-free zone extends along an entire length of the packaging, continuously in a machine direction, in a lane having continuously parallel edges;
scoring the film layer to form at least one pull tab within the adhesive-free zone and at least one resealable flap which is continuous with the at least one pull tab; and
scoring the base layer to form at least one cavity which is aligned with the resealable flap.

16. The method of claim 15, wherein a die cutting machine is utilized to score the film and base layer.

17. The method of claim 15, wherein a laser is utilized to score the film and base layer.

18. The method of claim 15, wherein the adhesive zone is pattern applied to avoid the adhesive-free zone.

19. The method of claim 15, wherein the pressure sensitive adhesive is disposed throughout the base layer and film layer and wherein the pressure sensitive adhesive is partially deactivated, continuously in the machine direction, to create the adhesive-free zone.

20. A film laminate comprising a plurality of flexible packaging structures comprising:
a substrate base layer; and
a film layer at least partially releasably affixed to the substrate base layer via a pressure sensitive adhesive layer, the pressure sensitive adhesive layer comprising:
at least one adhesive zone, and
at least one adhesive-free zone, wherein the at least one adhesive-free zone extends in a continuous lane having parallel edges, in a machine direction, through an entire length of the plurality of packaging structures;
wherein the film layer is scored to form at least one pull tab, in each of the plurality of packaging structures, which is disposed within the at least one adhesive-free zone; and
wherein the substrate base layer is scored to form at least one cavity which is disposed adjacent the at least one adhesive-free zone.

21. A flexible packaging comprising:
a substrate base layer; and
a film layer at least partially releasably affixed to the substrate base layer via a pressure sensitive adhesive layer, the pressure sensitive adhesive layer comprising:
at least one adhesive zone, and
at least one adhesive-free zone, wherein the at least one adhesive-free zone extends continuously in a machine direction, in the approximate center of the film layer, in a lane having continuously parallel edges;
wherein the film layer is scored to form at least one pull tab which is disposed within the at least one adhesive-free zone;

wherein the substrate base layer is scored to form at least two cavities, each cavity being disposed adjacent to opposite sides of the at least one adhesive-free zone; and wherein the at least one continuous adhesive-free zone is disposed between the two cavities and has a width which is less than the distance between the two cavities.

\* \* \* \* \*